United States Patent [19]

Habegger

[11] 4,184,589
[45] Jan. 22, 1980

[54] DIMENSIONALLY STABLE SYNTHETIC CONVEYOR BELT

[75] Inventor: Fernand Habegger, Biel-Benken, Switzerland

[73] Assignee: Habasit AG, Reinach, Switzerland

[21] Appl. No.: 898,992

[22] Filed: Apr. 21, 1978

[30] Foreign Application Priority Data

Apr. 28, 1977 [CH] Switzerland .................. 5319/77

[51] Int. Cl.² ........................... F16G 1/21; F16G 1/08
[52] U.S. Cl. ................................ 198/847; 74/232; 156/137; 428/162; 428/174; 428/212; 428/287; 428/910
[58] Field of Search ............... 428/174, 292, 295, 282, 428/910, 212, 162, 287; 74/231 R, 231 P, 231 CB, 232, 233; 156/137–140, 142; 198/844–847, 699

[56] References Cited

U.S. PATENT DOCUMENTS

| | | | |
|---|---|---|---|
| 2,797,729 | 7/1957 | Runton | 428/295 |
| 3,871,946 | 3/1975 | Romanski et al. | 74/232 |
| 3,968,703 | 7/1976 | Bellman | 74/231 C |
| 4,052,909 | 10/1977 | Warner | 74/231 P |

*Primary Examiner*—George F. Lesmes
*Assistant Examiner*—P. Thibodeau
*Attorney, Agent, or Firm*—Neil F. Markva

[57] ABSTRACT

A dimensionally stable synthetic internal support conveyor belt which comprises (a) at least one homogeneous, flat tape of a molecularly oriented plastic with a modulus of elasticity of 15,000 to 25,000 kp/cm². This tape has a fixed profile on both of its large area surfaces and includes reinforcement ribs arranged with their components extending predominantly in the longitudinal direction of the tape. Binding layers are composed of an elastic material with a modulus of elasticity of 800 to 1,000 kp/cm² and interlock with the profile on both sides of the tape. Each of the binding layers may be covered with a synthetic fabric. Each of the two binding layers with each of the two synthetic fabrics may be covered with a cover plate of elastomers or thermoplastics.

13 Claims, 6 Drawing Figures

DIMENSIONALLY STABLE SYNTHETIC CONVEYOR BELT

BACKGROUND OF THE INVENTION

For transport purposes, conveyor belts of the most varying constructions and designs are used. One differentiates in practice between heavy carcass and internal support conveyor belts. Heavy carcass belts are used for transporting stones, coal, etc. and are mostly trough-shaped. Internal transport conveyor belts are used especially for internal transport of, for example, foods, baggage, chemicals, people, etc. and are nearly always flat and used on a support surface (table, rollers etc.).

The invention relates to a conveyor belt of the latter type. Such conveyor belts usually consist of one or more load carrying synthetic fabrics, e.g. of polyamide or polyester, which are coated on one or two sides with elastomers or thermoplastics, e.g., with rubber, polyvinyl chloride or polyurethane. The single layers are bonded together in any known way with elastic binding layers, e.g. of rubber, polyvinyl chloride or polyurethane.

To improve the dimensional stability in longitudinal and/or transverse direction of these conveyor belts, the prior art incorporates suitable reinforcing elements. Dimensional stability in the longitudinal direction is attempted by the use of several superimposed load-carrying fabrics. However, this combination decreases the flexibility of the belts so that pulleys of correspondingly larger diameter have to be used. The dimensional stability in the transverse direction to maintain the conveyor belt surfaces flat is achieved generally with measures as shown in FIGS. 1 and 2. A load-carrying fabric is used which is not only fixed thermally but also includes a weft material comprising a steel wire or monofil plastic wire, e.g. of polyamide or polyester, having a high modulus of elasticity. At least two such reinforced load-carrying fabrics are bonded together at a certain distance by an elastic binding layer.

SUMMARY OF THE INVENTION

It is an object of the present invention to provide a dimensionally stable synthetic conveyor belt which does not have the disadvantages of the prior art conveyor belts. The dimensional stability in longitudinal and transverse direction achieved by using in the construction of the belt, at least one homogeneous, flat tape of plastic material having a profile on both of its large area surfaces. The profile consist of reinforcement ribs which are arranged in such a way that their components extending in the longitudinal direction of the tape are predominant. In other words, the profile includes projections directed outwardly from the tape and extending predominantly in the longitudinal direction of the tape.

The dimensionally stable synthetic conveyor belt according to the invention is therefore characterized by at least one homogeneous, flat tape of a molecularly oriented plastic with a modulus of elasticity of 15,000 to 25,000 kp/cm². The tape has a thermally fixed profile on both large area surfaces. Binding layers of an elastic material interlock with the profile on both sides of the tape and the elastic material has a modulus of elasticity of 800 to 1,000 kp/cm². Each of the two binding layers is preferably covered with a synthetic fabric. It is also preferred to cover each of the two binding layers resp. each of the two synthetic fabrics with cover or wear plates of elastomers or thermoplastics.

The conveyor belt according to the invention can be preferably produced by imparting the required profile to a homogeneous, flat plastic tape, fixing the profile by heat treatment and then joining the components of the conveyor belt in one step to a composite body by means of pressure and heat, using presses or calenders.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DETAILED DESCRIPTION

Figure 1:
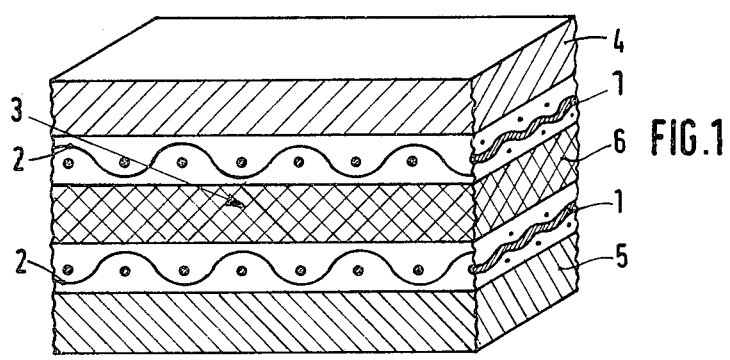
FIG. 1 shows a schematic perspective view of a prior art conveyor belt cut longitudinally.
Figure 2:
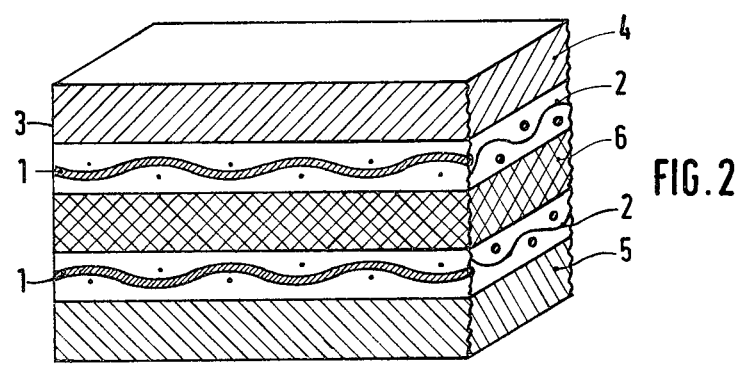
FIG. 2 shows a schematic perspective view of the conveyor belt of FIG. 1 cut transversely.

FIGS. 1 and 2 show the prior belt having a weft thread 1, a warp thread 2, a cut edge 3, outer coatings or cover plates 4 and 5, and an elastic binding layer 6.

With reinforced load-carrying fabrics of the type described, the warp thread 2 takes up the tensile stress, while the weft thread 1 serves as transversal stiffening. Various disadvantages must be tolerated when using steel wires or monofil plastic wires as weft threads 1. Firstly, the longitudinal elements, i.e., the warp threads 2, cause a high inherent or structural elongation in the longitudinal direction since they do not lie flat due to the relatively large diameter of the weft threads 1 so that the static load characteristic is not linear. Secondly, the welf threads 1 produce running noises when the conveyor belts are used without cover plates. Furthermore, weft threads 1 impede running over slanting edges or rollers, and while protruding from the cut edges 3 create a danger of injury.

Figure 3:
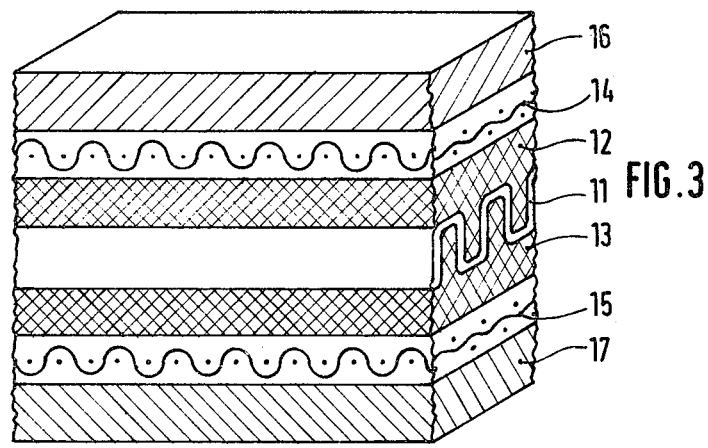
FIG. 3 shows a schematic perspective view of a longitudinally cut conveyor belt according to the invention.
Figure 4:
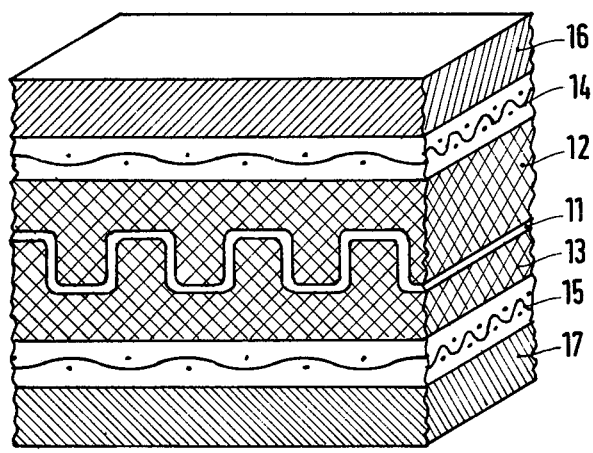
FIG. 4 shows a schematic perspective view of the transversely cut conveyor belt of FIG. 3.

In FIGS. 3 and 4 a homogeneous plastic tape 11 has a corrugated profile with outwardly directed projections as shown. Binding layers 12 and 13 of an elastic material are pressed into the profile on respective sides of tape 11. Each binding layer 12 and 13 is covered with a synthetic fabric 14 and 15 which are themselves covered with cover plates 16 and 17 of elastomers of thermoplastics.

The profiled plastic tape 11 can consist of polyester, polypropylene or preferably of a solvent-sealable polyamide, especially polyamide 6. The binding layers 12 and 13 can consist of polyester, rubber polyvinyl chloride, polyurethane or polyamide. The synthetic fabrics 14 and 15 with cover or wear plates 16 and 17 may be composed of the same material as the profiled plastic tape 11. The cover plates 16 and 17, if present, can consist of rubber, polyvinyl chloride, polyurethane or polyamide.

If the profiled plastic tape 11 is made of polyester or polypropylene, then polyester, rubber, polyvinyl chloride or polyurethane is conveniently used as the material of the binding layers 12 and 13. The synthetic fabrics 14 and 15 can be, if present, of the same plastic as the binding layers 12 and 13.

If the profiled plastic tape 11 is made of solvent-sealable polyamide, preferably polyamide 6, the binding layers 12 and 13 can be of plastified polyamide and the synthetic fabrics 14 and 15 and cover plates 16 and 17, if present, can also be made of polyamide. In this case, the ends of the conveyor belt can be easily joined together by solvent sealing.

Figure 5:
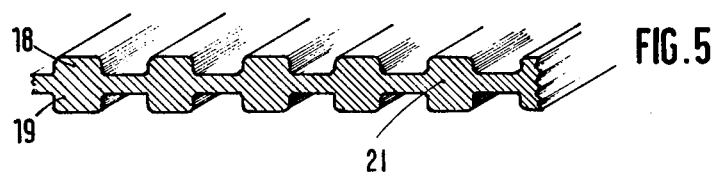
FIG. 5 shows a perspective view of an embodiment of a homogeneous, flat profiled plastic tape.

In FIG. 5, a homogeneous, flat plastic tape 21 has reinforcing ribs 18 and 19. Similar effects can be obtained with such a plastic tape 21 of varying thickness as with a longitudinally corrugated plastic tape 11 as shown in FIGS. 3 and 4.

The homogeneous, flat, profiled plastic tape 21 takes up the whole tensile stress of the conveyor belt and shows practically no inherent or structural elongation. The profile is fixed by heat treatment. Through the embedding of the elastic binding layers, under pressure, longitudinal and lateral forces with stabilizing effects are produced. Besides this, the binding layers prevent deformation of the profile.

If all the components of the conveyor belt consist of the same material, the conveyor belt is a homogeneous componsite body, the load characteristic of which is linear in the range of use up to about 5% elongation in case of a suitable molecular orientation degree of the profiled plastic tape. The maximum admissible load of the conveyor belt must be up to 30 or 35 kg/cm width, for transport of persons up to 90 kg/cm width.

Figure 6:
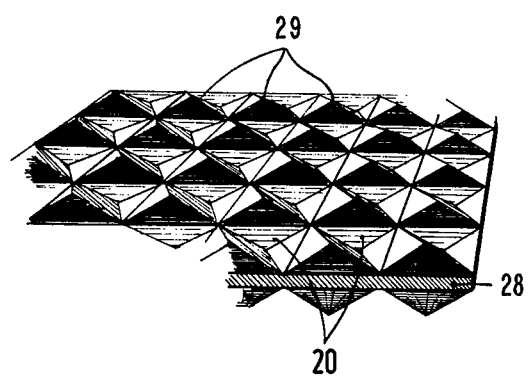
FIG. 6 shows a perspective view of another embodiment of a homogeneous, flat profiled plastic tape.

The plastic tape of FIG. 6 has a base tape 28 having a profile on both sides in the form of triangular pyramids 29. Recesses 20 are located between pyramids 29 and are also in the shape of triangular pyramids 29.

In principle, the profile can comprise any abutting or intersecting shapes as long as their components extending in the longitudinal direction are predominant.

What is claimed is:

1. A dimensionally stable synthetic internal support conveyor belt which comprises:
    (a) at least one homogeneous, flat tape composed of a molecularly orientated plastic with a modulus of elasticity of 15,000 to 25,000 kp/cm$^2$,
    (b) said tape having a fixed profile on both of its large area surfaces,
    (c) said profile including reinforcement ribs arranged with their components extending predominantly in the longitudinal direction of the tape, and
    (d) binding layers composed of an elastic material with a modulus of elasticity of 800 to 1,000 kp/cm$^2$,
    (e) said binding layers interlocking with the profile on both sides of the tape.

2. A conveyor belt as defined in claim 1, wherein said flat tape comprises several homogeneous, flat profiled plastic tapes.

3. A conveyor belt as defined in claim 1, wherein the plastic tape consists of a solvent-sealable polyamide, the binding layers consist of plastified polyamide and synthetic fabrics consist of polyamide and cover the binding layers.

4. A conveyor belt as defined in claim 3 wherein a cover plate covers each of the synthetic fabrics and consists of polyamide.

5. A dimensionally stable synthetic internal support conveyor belt which comprises:
    (a) at least one homogeneous, flat tape composed of a molecularly oriented plastic with a modulus of elasticity of 15,000 to 25,000 kp/cm$^2$,
    (b) said tape having a fixed profile on both of its large area surfaces,
    (c) said profile including outwardly directed projections in the form of triangular pyramids arranged to extend predominantly in the longitudinal direction of the tape, and
    (d) binding layers composed of an elastic material with a modulus of elasticity of 800 to 1,000 kp/cm$^2$,
    (e) said binding layers interlocking with the profile on both sides of the tape.

6. A conveyor belt as defined in claim 5 wherein a synthetic fabric covers each of the two binding layers.

7. A conveyor belt as defined in claim 6 wherein a cover plate of elastomers or thermoplastics covers each of the two synthetic fabrics.

8. A conveyor belt as defined in claim 7 wherein the flat tape consists of a solvent-sealable polyamide, the binding layers consist of plastified polyamide, and the synthetic fabrics, as well as the cover plates also consist of polyamide.

9. A conveyor belt as defined in claim 5 wherein the outwardly directed projections define parallel grooves extending longitudinally of the belt.

10. A conveyor belt as defined in claim 5 wherein the homogeneous, flat tape has a thickness periodically varying in the transverse direction of the tape and is composed of plastic material.

11. A conveyor belt as defined in claim 5 wherein said flat tape comprises several homogeneous, flat profiled plastic tapes.

12. A dimensionally stable synthetic internal support conveyor belt which comprises:
    (a) at least one homogeneous, flat tape composed of a molecularly orientated plastic with a modulus of elasticity of 15,000 to 25,000 kp/cm$^2$,
    (b) said tape having a fixed profile on both of its large area surfaces,
    (c) said profile including parallel grooves and reinforcement ribs arranged with their components extending predominantly in the longitudinal direction of the tape, and
    (d) binding layers composed of an elastic material with a modulus of elasticity of 800 to 1,000 kp/cm$^2$,
    (e) said binding layers interlocking with the profile on both sides of the tape.

13. A dimensionally stable synthetic internal support conveyor belt which comprises:
    (a) at least one homogeneous, flat tape composed of a molecularly orientated plastic with a modulus of elasticity of 15,000 to 25,000 kp/cm$^2$,
    (b) said tape having a fixed profile on both of its large area surfaces and having a thickness periodically varying in the transverse direction of the tape,
    (c) said profile including reinforcement ribs arranged with their components extending predominantly in the longitudinal direction of the tape, and
    (d) binding layers composed of an elastic material with a modulus of elasticity of 800 to 1,000 pk/cm$^2$,
    (e) said binding layers interlocking with the profile on both sides of the tape.

* * * * *